US012454402B2

(12) United States Patent
Tolazzi et al.

(10) Patent No.: US 12,454,402 B2
(45) Date of Patent: Oct. 28, 2025

(54) PACKAGING FOR A CIRCULAR INSERTION TOOL

(71) Applicant: Robert Bosch GmbH, Stuttgart (DE)

(72) Inventors: Massimo Tolazzi, Udine (IT); Sara Cappellari, Udine (IT)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 18/253,668

(22) PCT Filed: Nov. 16, 2021

(86) PCT No.: PCT/EP2021/081759
§ 371 (c)(1),
(2) Date: May 19, 2023

(87) PCT Pub. No.: WO2022/106378
PCT Pub. Date: May 27, 2022

(65) Prior Publication Data
US 2024/0002138 A1  Jan. 4, 2024

(30) Foreign Application Priority Data

Nov. 23, 2020 (DE) ...................... 10 2020 214 674.8

(51) Int. Cl.
*B65D 85/02* (2006.01)
*B65D 25/22* (2006.01)
(Continued)

(52) U.S. Cl.
CPC ............ *B65D 85/02* (2013.01); *B65D 25/22* (2013.01); *B65D 73/0021* (2013.01); *B65D 85/58* (2013.01)

(58) Field of Classification Search
CPC .. B65D 5/2033; B65D 5/2057; B65D 5/5007; B65D 5/2066; B65D 5/2014;
(Continued)

(56) References Cited

U.S. PATENT DOCUMENTS 2,471,173 A     5/1949  Taylor
5,456,057 A  * 10/1995  Bannon .................. B65B 15/00
                                                          206/349

(Continued)

FOREIGN PATENT DOCUMENTS

CN       101559851 A     10/2009
CN       101734434 A      6/2010
(Continued)

OTHER PUBLICATIONS

International Search Report corresponding to PCT Application No. PCT/EP2021/081759, mailed Mar. 17, 2022 (German and English language document) (5 pages).

*Primary Examiner* — Mollie Impink
(74) *Attorney, Agent, or Firm* — Maginot, Moore & Beck LLP

(57) ABSTRACT

In a packaging for a circular insertion tool, in particular a circular saw blade, with a planar main body, which has a holding flange for fixing an associated insertion tool on the planar main body, the planar main body has a polygonal outer circumference, with a tab which is bendable in the direction of the holding flange being arranged on at least one side of the polygonal outer circumference.

16 Claims, 4 Drawing Sheets

(51) Int. Cl.
*B65D 73/00* (2006.01)
*B65D 85/58* (2006.01)

(58) Field of Classification Search
CPC ............... B65D 5/2047; B65D 5/2028; B65D 73/0021; B65D 73/2585; G11B 33/0494
USPC ....................................................... 206/396
See application file for complete search history.

(56) References Cited

U.S. PATENT DOCUMENTS

| | | |
|---|---|---|
| 6,347,702 B1 | 2/2002 | Bruderer et al. |
| 6,729,468 B1 | 5/2004 | Dobmeier |
| 7,066,327 B2 * | 6/2006 | Baublitz ................ B65D 75/22 206/349 |
| 2005/0133389 A1 | 6/2005 | Baublitz et al. |
| 2010/0072093 A1 | 3/2010 | Cross |
| 2012/0160792 A1 | 6/2012 | Kim et al. |
| 2015/0251307 A1 | 9/2015 | Wang |

FOREIGN PATENT DOCUMENTS

| | | | |
|---|---|---|---|
| CN | 103241474 A | 8/2013 | |
| DE | 202 19 617 U1 | 6/2004 | |
| DE | 20 2006 009 311 U1 | 10/2006 | |
| DE | 9211826 U1 * | 11/2012 | ........... B65D 75/566 |
| GB | 2 379 920 A | 3/2003 | |

* cited by examiner

PACKAGING FOR A CIRCULAR INSERTION TOOL

This application is a 35 U.S.C. § 371 National Stage Application of PCT/EP2021/081759, filed on Nov. 16, 2021, which claims the benefit of priority to Serial No. DE 10 2020 214 674.8, filed on Nov. 23, 2020 in Germany, the disclosures of which are incorporated herein by reference in their entirety.

BACKGROUND

The present disclosure relates to a packaging for a circular insertion tool, in particular a circular saw blade, with a planar main body having a holding flange for fixing an associated insertion tool on the planar main body.

Such a packaging for a circular saw blade is known from the prior art. The packaging is formed in a circular fashion and has a central holding flange for the circular saw blade. In addition, a packaging for a circular saw blade is known, having a rectangular main body with a circular receptacle for receiving the circular saw blade.

SUMMARY

The disclosure relates to a packaging for a circular insertion tool, in particular a circular saw blade, with a planar main body having a holding flange for fixing an associated insertion tool on the planar main body. The planar main body has a polygonal outer circumference, wherein a tab that is bendable towards the holding flange is arranged on at least one side of the polygonal outer circumference.

The disclosure thus enables a packaging of a circular insertion tool to be provided, in which a safe and reliable handling can be enabled by the bendable tab during transport and/or storage of the circular insertion tool.

Preferably, the planar main body has an octagonal outer circumference with eight sides.

Thus, a suitable main body for the arrangement of the bendable tab can be provided in a simple manner.

The bendable tab is preferably formed integrally with the planar main body via a bending portion, wherein the bendable tab is configured as an extension of the planar main body in the radial direction.

Thus, a robust configuration of the bendable tab on the planar main body can be enabled.

According to one embodiment, the bendable tab has at least one fastening hook and the planar main body is provided with at least one blocking member for blocking the at least one fastening hook in order to enable a fastening of the bendable tab in a bent position on the planar main body.

Thus, a circular insertion tool can be arranged in an easy and uncomplicated manner on the planar main body and secured to the planar main body in the bent tab position.

The holding flange is preferably conical in form.

A secure and reliable fixing of the circular insertion tool on the holding flange can thus be enabled.

Preferably, at least one pivotable hanger is provided on the polygonal outer circumference for receiving an associated hanging element having a Euro opening and/or a keyhole opening.

Thus, an arrangement on a hanging element, e.g., on a sales stand and/or a storage shelf, can be facilitated in a simple manner.

The planar main body preferably has at least one positioning web in the region of the bendable tab.

Thus, an arrangement of the circular insertion tool in the packaging can be safely and reliably enabled while preventing an unwanted rotation thereof.

According to one embodiment, the planar main body has at least one through-opening in order to enable an ejection of an insertion tool fixed on the planar main body.

Thus, an ejection of the insertion tool can be enabled in a simple and uncomplicated manner.

Preferably, a protrusion is provided on a rear side of the planar main body in the region of the bendable tab.

Thus, an orderly stacking of a plurality of packages on top of one another can advantageously be facilitated.

Preferably, at least one portion is provided for the arrangement of a label.

Thus, information regarding the insertion tool can be visualized by the label in an easy and uncomplicated manner.

According to one embodiment, the planar main body has plastic.

Thus, a stable and robust planar main body can be provided, and a provision of a reusable packaging can be enabled.

BRIEF DESCRIPTION OF THE DRAWINGS

The disclosure is explained in further detail in the following description with reference to exemplary embodiments shown in the drawings. The figures show.

DETAILED DESCRIPTION

Figure 1:
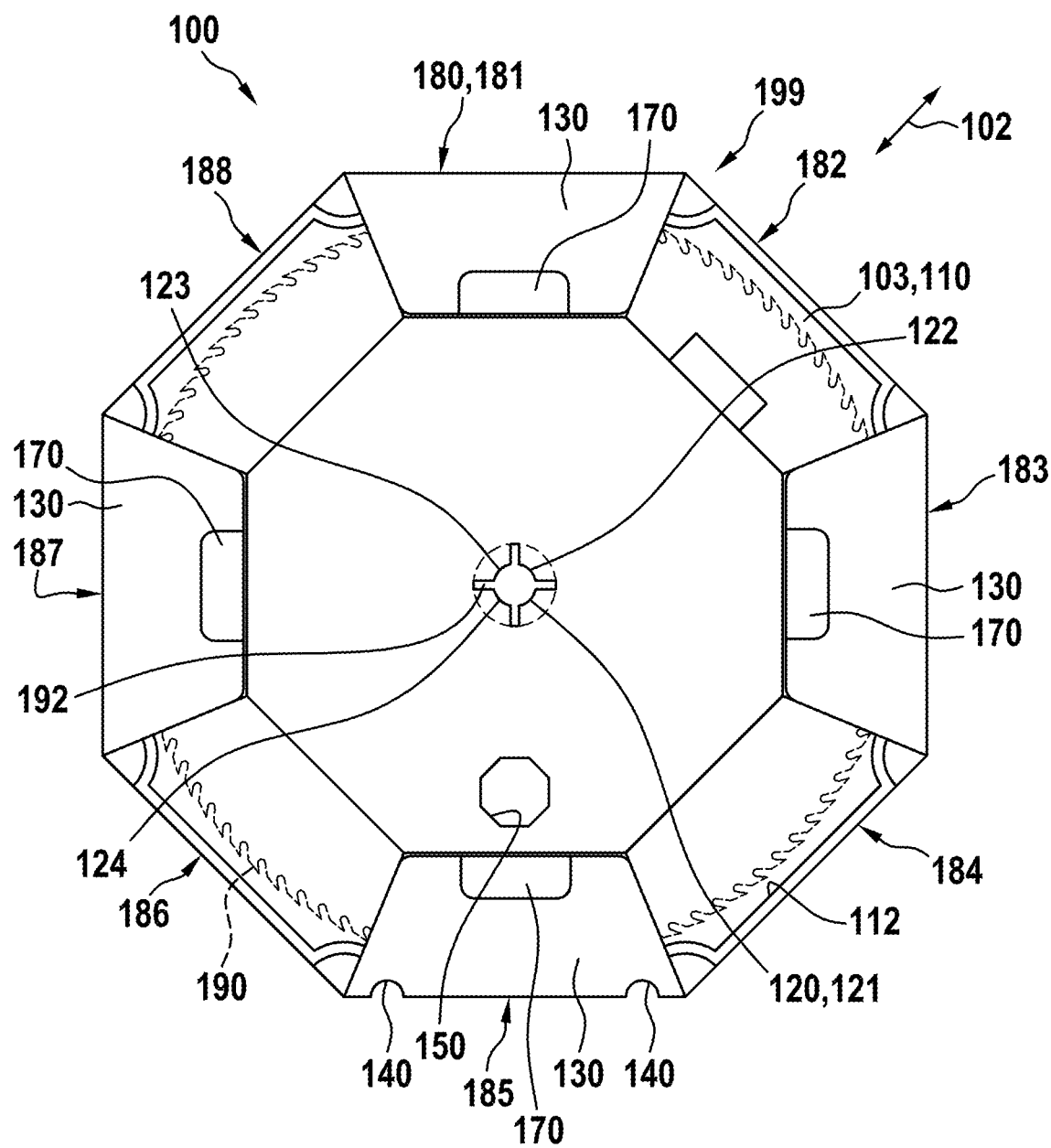
FIG. 1 a plan view of a packaging according to the disclosure with bendable tabs illustrated in a bent position, FIG. 2 a plan view of the packaging of FIG. 1 with the bendable tabs in an unbent position, FIG. 3 a rear view of the packaging of FIG. 1 and FIG. 2 with the bendable tabs in the bent position, FIG. 4 an enlarged view of a bendable tab in the unbent position of FIG. 2, and FIG. 5 an enlarged view of a holding flange associated with the packaging of FIG. 1 through FIG. 4.

Elements having the same or a comparable function are provided with the same reference numerals in the figures and are described in detail only once.

FIG. 1 illustrates an exemplary packaging 100 for a preferably circular insertion tool 190 viewed from its front face 103. According to one embodiment, the circular insertion tool 190 is configured as a circular saw blade. Preferably, the packaging 100 is configured so as to receive an insertion tool 190 having a diameter of 160 mm to 305 mm.

The packaging 100 preferably has a planar main body 110 with a polygonal outer circumference 180. Preferably, the planar main body 110 has an octagonal outer circumference 180 with eight sides 181-188. It is noted, however, that the main body 110 can alternatively have any number of sides.

Preferably, the main body 110 has a receptacle 112 for receiving the insertion tool 190. The insertion tool 190 arranged in the receptacle 112 is preferably embedded in or surrounded by the main body 110. Furthermore, the main body 110 preferably has a holding flange 120 for fixing the insertion tool 190 to the main body 110. Preferably, the holding flange 120 is arranged centrally on the main body 110, and preferably integrally formed therewith.

According to one embodiment, the holding flange 120 has at least two, for the purposes of illustration four web portions 121-124. The web portions 121-124 are preferably arranged spaced apart from one another, or between two adjacent web portions 121-124 a respective gap 192 is arranged, whereby the web portions 121-124 are advantageously formed in a springing manner.

Preferably, the main body 110 has a tab 130 on at least one side 181-188 of the polygonal outer circumference 180 that can be bent towards the holding flange 120. For the purposes of illustration, there are four tabs 130. Preferably, one respective tab 130 is arranged on each of the sides 181, 183, 185, 187. Accordingly, for the purposes of illustration, a respective tab 130 is arranged in a 12 o'clock position, 3 o'clock position, 6 o'clock position, and 9 o'clock position of the main body 110.

More generally, at least two tabs 130 are preferably arranged at least approximately diametrically opposite one another. It is noted, however, that the tabs 130 can also be arranged irregularly. Furthermore, any number of tabs 130 can be present. For example, not each side 181-188 can have a tab 130, or they can have more than one tab 130.

In FIG. 1, the tabs 130 are arranged in a bent position 199 on the planar main body 110. Preferably, the tabs 130 are formed integrally with the main body 110, wherein the tabs 130 are formed as an extension of the main body 110 in the radial direction 102. Each tab 130 partially encloses an insertion tool 190 arranged in the packaging 100 on its outer circumference.

Preferably, at least one of the tabs 130 has an elevation 170 in a region facing the holding flange 120. Preferably, all of the tabs 130 have an elevation 170 in order to allow for slip-resistant stacking of a plurality of packages.

According to one embodiment, the main body 110 has plastic. Preferably, the main body 110 is an injection-molded part. In particular, the packaging 100 is preferably reusable and configured for both storage and transport of the insertion tool 190.

Furthermore, the main body 110 preferably has at least one through-opening 150 in order to allow for an ejection of an insertion tool 190 fixed on the main body 110. To eject the insertion tool 190 from the packaging 100, a user preferably applies force to the insertion tool 190 through the through-opening 150 from the rear (303 in FIG. 3) out of the packaging 100 towards the front side 103.

Moreover, one side, for the purposes of illustration the bottom-most side 185, has at least one, preferably two protrusions 140. Preferably, the protrusions 140 are also formed on the tab 130 associated with the side 185. The protrusions 140 are configured so as to, for example, allow for a rotationally secure arrangement of the packaging 100 in a sales shelf, where preferably the protrusion 140 stands up on a hanging apparatus.

Figure 2:
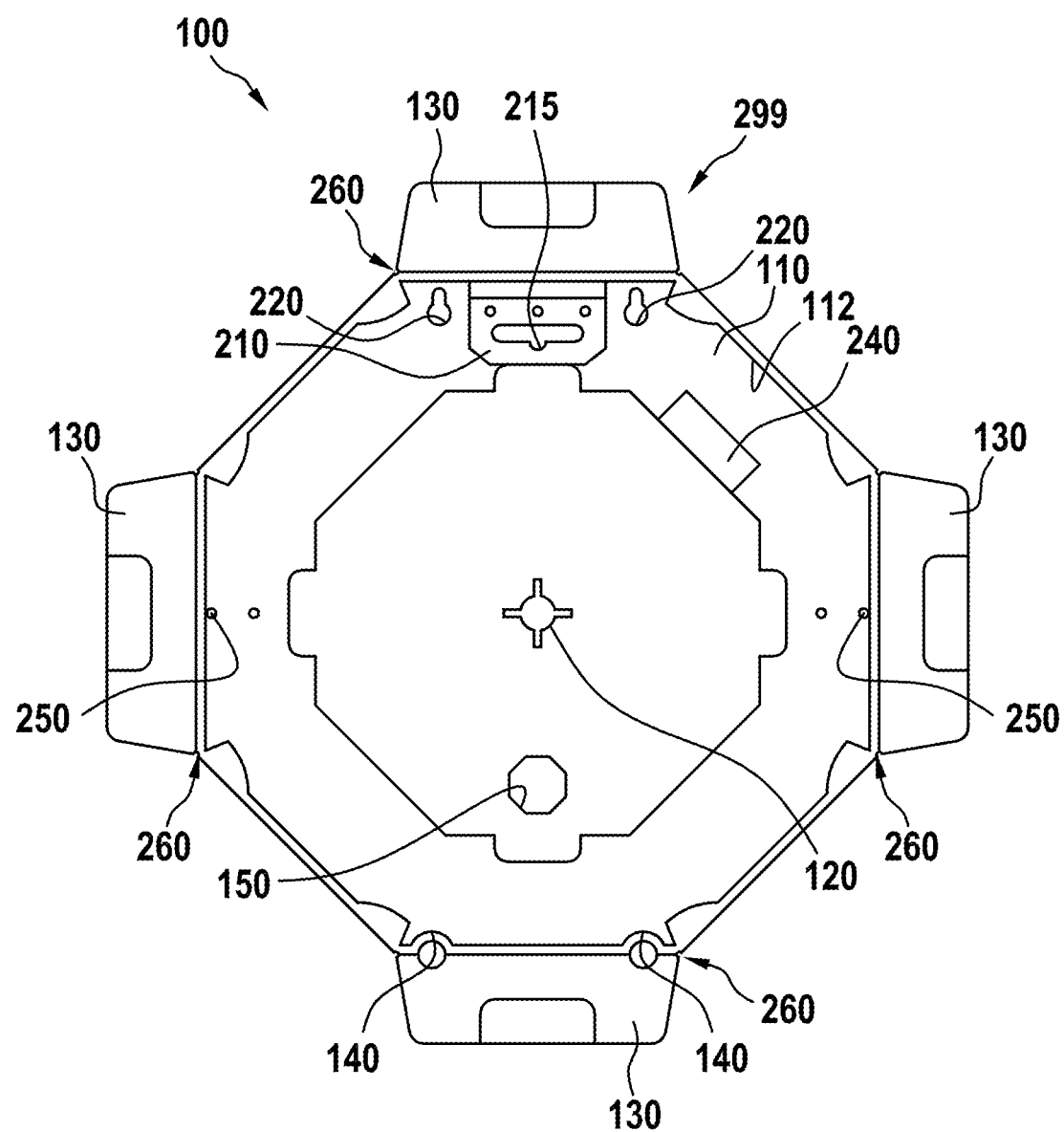

FIG. 2 illustrates the packaging 100 of FIG. 1 with the tabs 130 in an unbent position 299 in which the tabs 130 are opened or bent. Preferably, the tabs 130 are formed integrally with the main body 110 via a bending portion 260. Moreover, the tabs 130 are preferably bendable or pivotable at least by 180° about their bending portions 260.

According to one embodiment, on the polygonal outer circumference 180 (cf. FIG. 1), at least one hanger 215, 220 is provided for receiving an associated hanging element. For the purposes of illustration, three hangers 215, 220 are provided, wherein the hanger 215 is preferably configured as a Euro opening and the illustrated two hangers 220 are preferably configured as keyhole openings. Preferably, the hanger 215 has a pivotable portion 210 on which the Euro opening is formed. By way of example, the hangers 215, 220 are arranged in the region of the illustrated upper tab 130. The hanger 215 is preferably arranged between two hangers 220.

Moreover, the main body 110 preferably has at least one positioning web 250 at least in the region of a tab 130. For the purposes of illustration, two positioning webs 250 are shown, which are formed on opposing tabs 130. The positioning webs 250 are preferably associated with the illustrated right and left tabs 130. The positioning webs 250 are preferably configured so as to prevent a rotation of the insertion tool 190 arranged on the holding flange 120 in FIG. 1.

Figure 3:
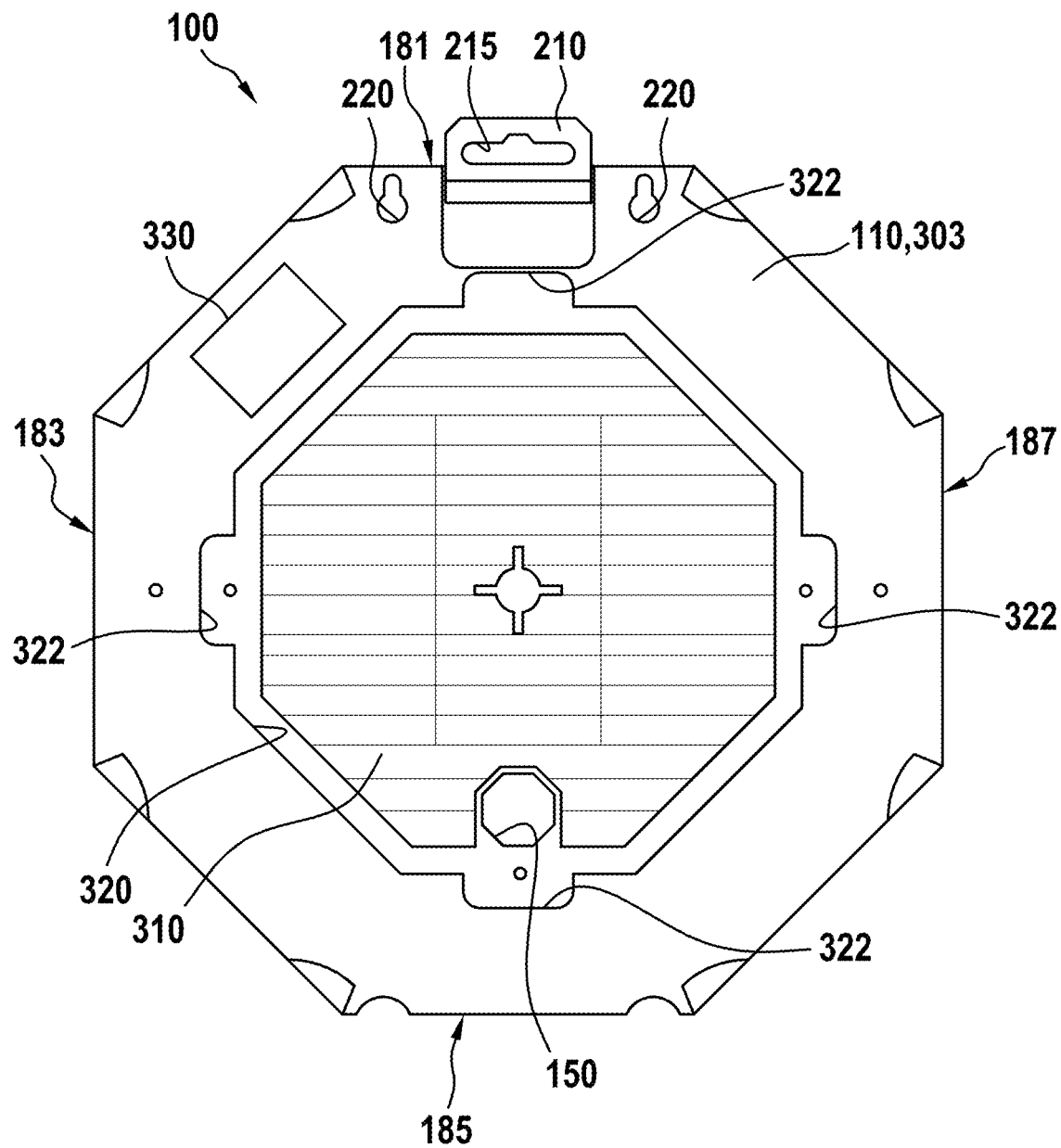

Furthermore, the main body 110 has at least one portion 240 (or 320, 330 in FIG. 3) for arranging a label (310 in FIG. 3). The portion 240 is preferably configured so as to arrange a label with a bar code.

FIG. 3 shows an exemplary rear side 303 of the packaging 100 of FIG. 1 and FIG. 2. In FIG. 3, the pivotable portion 210 of the hanger 215 is pivoted upwards for the purposes of illustration such that the packaging 100 can be suspended from the hanger 215.

Furthermore, FIG. 3 illustrates a central protrusion 320 formed on the rear face 303. Preferably, the protrusion 320 is polygonal, in particular octagonal, similar to the outer circumference 180. Preferably, a respective extension 322 is formed in the region of the tab 130 or the sides facing the sides 181, 183, 185, 187 of the protrusion 320. When stacking a plurality of packages 100 on top of one another, the elevation 170 of FIG. 1 of the tab 130 from another packaging 100 is arranged in a respective extension 322. Preferably, the extensions 322 are configured such that a plurality of packages 100 can be stacked in a slip-resistant manner one on top of the other. Preferably, more than ten packages 100 can be stacked one on top of the other.

For the purposes of illustration, a label 310 is arranged in the protrusion 320. Any data, in particular data relating to the use of the insertion tool 190, can be noted on the label 310. In addition, a further portion 330 is provided for arranging a label. Preferably, the portion 330 is configured so as to arrange a product label, wherein a product name, manufacturer name, bar code, etc. can be applied to the product label, for example. Preferably, the portion 330 is arranged outside of the protrusion 320.

Figure 4:
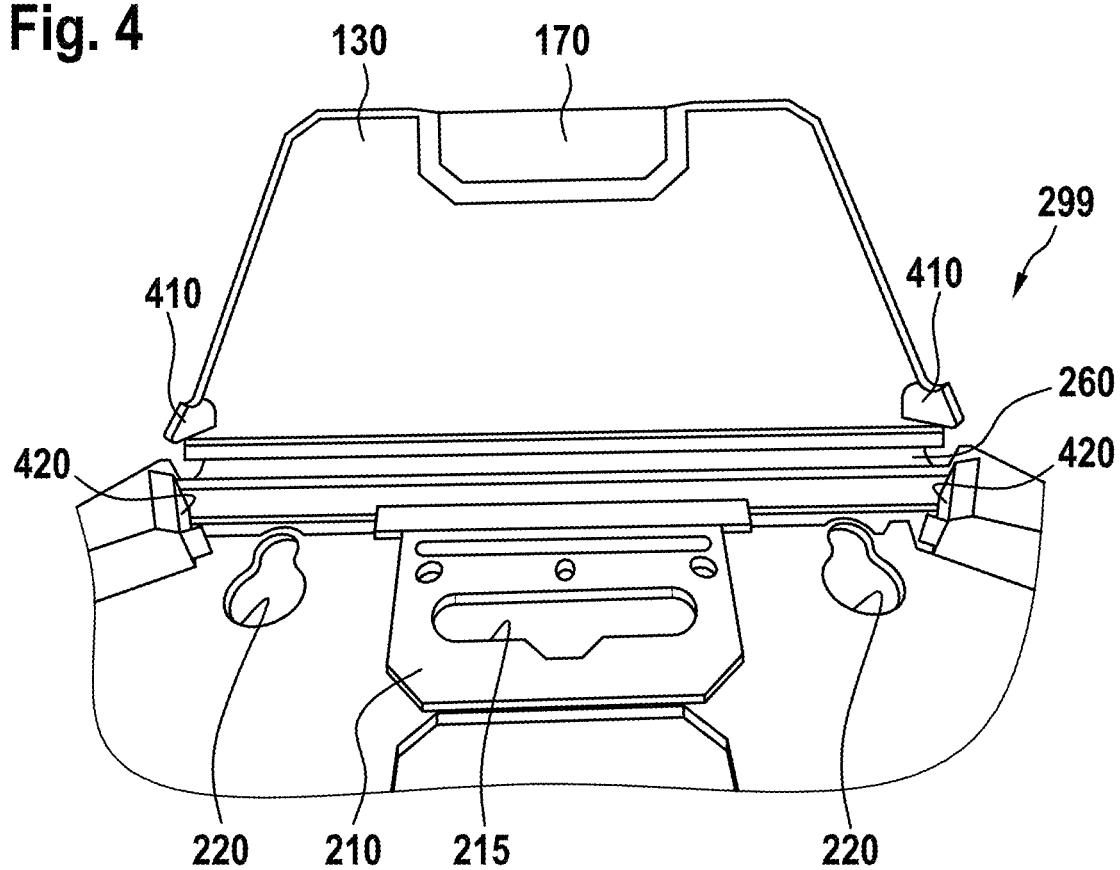

FIG. 4 shows a tab 130 of the packaging 100 of FIG. 1 through FIG. 3 in the unbent position 299 of FIG. 2. The tab 130 preferably has at least one fastening hook 410 and the main body 110 is preferably provided with at least one blocking member 420 for blocking the at least one fastening hook 410 in order to enable a fastening of the bendable tab 130 in the bent position 199 of FIG. 1 on the planar main body 110.

Preferably, at least one tab 130, particularly preferably all tabs 130, have at least one respective fastening hook 410. Preferably, as illustrated, the tab 130 has two fastening hooks 410. Preferably, the fastening hooks 410 are arranged on the outer circumference of the tab 130 in the region of the bending portion 260. Similarly, for the purposes of illustration, two blocking members 420 are arranged in the region of the outer circumference of the main body 110 facing the bending portion 260. According to one embodiment, each blocking member 420 is configured as a receptacle. It is noted, however, that the tab 130 can comprise the blocking member 420 according to an alternative embodiment, and the main body 110 can comprise the fastening hook 410.

Figure 5:
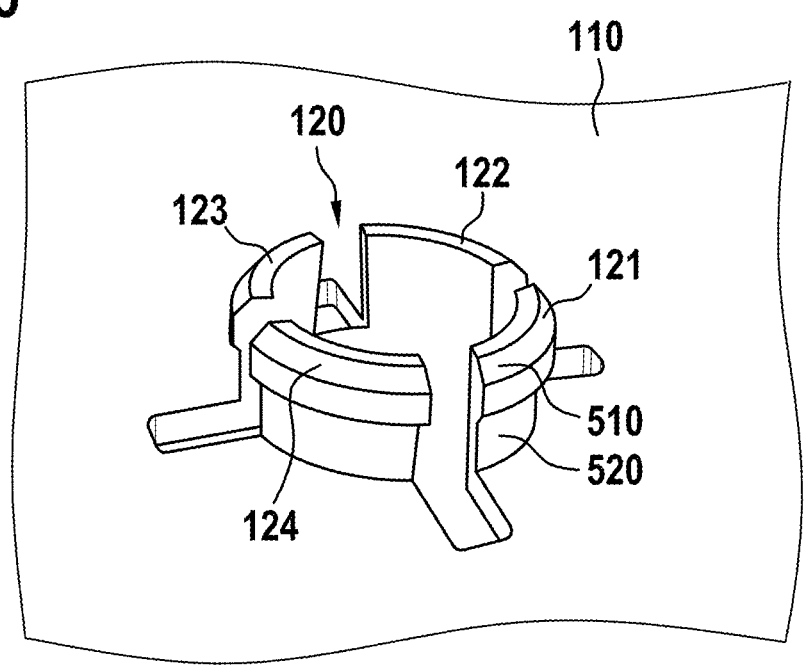

FIG. 5 shows the holding flange 120 of the packaging 100 of FIG. 1 through FIG. 3. The holding flange 120 preferably has the web portions 121-124, which are preferably arranged perpendicular to the main body 110. Preferably, each of the web portions 121-124 has a web 520 and a collar 510. For the purposes of illustration, the collar 510 is arranged at the free end of the web 520. The collar 510 preferably has a larger outer diameter than the web 520.

Preferably, the holding flange 120 is conical. This can allow for a positive connection between the holding flange 120 and the insertion tool 190 for a safe and reliable arrangement of the insertion tool 190.

The invention claimed is:

1. A packaging for a circular insertion tool, the packaging comprising:
   a planar main body having a polygonal outer circumference; and
   a holding flange configured to fix the insertion tool on the planar main body,
   wherein the planar main body includes at least one bendable tab, each of which is bendable in a direction toward the holding flange, and each of which is arranged on at least one side of the polygonal outer circumference, and
   wherein the planar main body includes a protrusion arranged on a rear side of the planar main body in a region of a distal end of the at least one bendable tab when the at least one bendable tab is bent in the direction toward the holding flange such that the protrusion is receivable between bent tabs of another packaging to enable multiple packages to be stacked.

2. The packaging according to claim 1, wherein the planar main body has an octagonal outer circumference with eight sides.

3. The packaging according to claim 1, wherein:
   each bendable tab of the at least one bendable tab is formed integrally with the planar main body via a bending portion, and
   each bendable tab is formed as an extension of the planar main body in a radial direction.

4. The packaging according to claim 1, wherein:
   the at least one bendable tab has at least one fastening hook, and
   the planar main body includes at least one blocking member configured to block movement of the at least one fastening hook so as to enable fastening of the at least one bendable tab in a bent position on the planar main body.

5. The packaging according to claim 1, wherein the holding flange includes a frustoconical portion.

6. The packaging according to claim 1, wherein the planar main body includes at least one pivotable hanger arranged on the polygonal outer circumference, the at least one pivotable hanger having an Euro opening and/or a keyhole opening configured to receive an associated hanging element.

7. The packaging according to claim 1, wherein the planar main body has at least one positioning projection in a region of the at least one bendable tab.

8. The packaging according to claim 1, wherein the planar main body has at least one through-opening configured to enable ejection of the insertion tool fixed on the planar main body.

9. The packaging according to claim 1, wherein the planar main body includes at least one portion configured for arranging a label.

10. The packaging according to claim 1, wherein the planar main body is formed at least partially of plastic.

11. The packaging according to claim 1, wherein the packaging is configured to receive a circular saw blade as the circular insertion tool.

12. A packaging for a circular insertion tool, the packaging comprising:
    a planar main body having a polygonal outer circumference; and
    a holding flange configured to fix the insertion tool on the planar main body,
    wherein the planar main body includes at least one bendable tab, each of which is bendable in a direction toward the holding flange, and each of which is arranged on at least one side of the polygonal outer circumference,
    wherein the planar main body includes a protrusion arranged on a rear side of the planar main body in a region of a distal end of the at least one bendable tab when the at least one bendable tab is bent in the direction toward the holding flange, and
    wherein the at least one bendable tab includes at least two bendable tabs arranged on the planar main body diametrically opposite one another.

13. The packaging according to claim 2, wherein the at least one bendable tab includes four bendable tabs, each of which is arranged on one of the eight sides.

14. The packaging according to claim 13, wherein each of the four bendable tabs is arranged on a diametrically opposite side of the eight sides from another one of the four bendable tabs.

15. A packaging for a circular insertion tool, the packaging comprising:
    a planar main body having a polygonal outer circumference; and
    a holding flange configured to fix the insertion tool on the planar main body,
    wherein the planar main body includes at least one bendable tab, each of which is bendable in a direction toward the holding flange, and each of which is arranged on at least one side of the polygonal outer circumference,
    wherein the planar main body includes a protrusion arranged on a rear side of the planar main body in a region of a distal end of the at least one bendable tab when the at least one bendable tab is bent in the direction toward the holding flange, and
    wherein the protrusion has a shape similar to the polygonal outer circumference.

16. The packaging according to claim 1, wherein each of the at least one bendable tab, when bent in the direction toward the holding flange, is spaced apart radially from the holding flange.

* * * * *